United States Patent
Wang et al.

(10) Patent No.: US 9,697,219 B1
(45) Date of Patent: Jul. 4, 2017

(54) MANAGING LOG TRANSACTIONS IN STORAGE SYSTEMS

(71) Applicant: EMC Corporation, Hopkinton, MA (US)

(72) Inventors: Yubing Wang, Southborough, MA (US); Philippe Armangau, Acton, MA (US); Jean-Pierre Bono, Westborough, MA (US); Christopher Seibel, Walpole, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 369 days.

(21) Appl. No.: 14/584,341

(22) Filed: Dec. 29, 2014

(51) Int. Cl.
*G06F 17/30* (2006.01)
*G06F 3/06* (2006.01)

(52) U.S. Cl.
CPC ...... *G06F 17/30144* (2013.01); *G06F 3/0619* (2013.01); *G06F 3/0643* (2013.01); *G06F 3/0689* (2013.01)

(58) Field of Classification Search
CPC ............ G06F 17/30144; G06F 3/0619; G06F 3/0643; G06F 3/0689
USPC ....................................................... 707/823
See application file for complete search history.

(56) References Cited

U.S. PATENT DOCUMENTS

| | | | | |
|---|---|---|---|---|
| 5,983,239 A * | 11/1999 | Cannon | ............. | G06F 17/30138 |
| 6,021,415 A * | 2/2000 | Cannon | ............. | G06F 17/30138 |
| 6,041,334 A * | 3/2000 | Cannon | ............. | G06F 17/30138 |
| | | | | 707/652 |
| 7,039,661 B1 * | 5/2006 | Ranade | ............. | G06F 17/30575 |
| | | | | 707/610 |
| 8,219,788 B1 * | 7/2012 | Cheng | ............. | G06F 9/455 |
| | | | | 712/225 |
| 8,225,315 B1 * | 7/2012 | Cheng | ............. | G06F 9/455 |
| | | | | 712/10 |
| 8,543,843 B1 * | 9/2013 | Cheng | ............. | G06F 9/3851 |
| | | | | 713/300 |
| 2011/0296437 A1 * | 12/2011 | Raut | ............. | G06F 9/526 |
| | | | | 719/314 |

OTHER PUBLICATIONS

Ferri, Cesare, et al., "Embedded-TM: Energy and complexity-effective hardware transactional memory for embedded multicore systems", J. Parallel Distrib. Comput., vol. 70, Issue 10, Oct. 2010, pp. 1042-1052.*

(Continued)

*Primary Examiner* — Robert Stevens
(74) *Attorney, Agent, or Firm* — Krishnendu Gupta; Jason A. Reyes; Deepika Bhayana

(57) ABSTRACT

A method is used in managing log transactions in storage systems. A first portion of a transaction log space is allocated from a persistent journal associated with a file system to a first core of a multi-core storage processor and a second portion of the transaction log space is allocated from the persistent journal to a second core of the multi-core storage processor. A set of per-core bitmaps is used for allocating a set of transaction log entries from the persistent journal. Each per-core bitmap is associated with a respective core of the multi-core storage processor. A per-core bitmap of the set of per-core bitmaps associated with a core of the multi-core storage processor is used for allocating a transaction log entry for a write request performed by the core.

20 Claims, 10 Drawing Sheets

(56) References Cited

OTHER PUBLICATIONS

Kachris, Christoforos, et al., "Transactional memories for multi-processor FPGA platforms", Journal of Systems Architecture, vol. 57, Issue 1, Jan. 2011, pp. 160-168.*

Preslan, Kenneth W., et al., "Implementing Journaling in a Linux Shared Disk File System", Eighth Goddard Conf. on Mass Storage Systems and Technologies in cooperation with the Seventh IEEE Symposium on Mass Storage Systems, Mar. 2000, pp. 351-378.*

\* cited by examiner

MANAGING LOG TRANSACTIONS IN STORAGE SYSTEMS

BACKGROUND

Technical Field

This application relates to managing log transactions in storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

An operating system, executing on a data storage system such as a file server, controls the allocation of a memory of the data storage system to host systems or clients connected to the data storage system. Allocation is generally performed at a page granularity, where a page is a selected number of contiguous blocks. The particular size of a page is typically a function of an operating system, the page size may be 8 kilobytes (KB).

To the operating system of a data storage system, a file system is a collection of file system blocks of a specific size. For example, the size of a file system block may be 8 kilobytes (KB). As the data storage system is initialized, some of the pages are reserved for use by the operating system, some pages are designated as 'free' for allocation to other applications, and a large chunk of pages are reserved to provide a buffer cache (also referred to as "buffer cache pool"). The buffer cache temporarily stores pages in a volatile memory of a data storage system that are also stored in an attached disk device to increase application performance.

File systems typically include metadata describing attributes of a file system and data from a user of the file system. A file system contains a range of file system blocks that store metadata and data. A user of a filesystem access the filesystem using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be many levels of indirect blocks arranged in an hierarchy depending upon the size of a file where each level of indirect blocks includes pointers to indirect blocks at the next lower level.

A write I/O request directed to a file using a "file sync" option (also referred to as "stable write") requires that a write operation directed to the file writes both data and metadata immediately to a disk rather than incurring a delay. However data and metadata may still be written into a cache. On the other hand, a write I/O request using a "data sync" option requires that data is written immediately to a disk but metadata may be cached and flushed to the disk at a later time.

The accuracy and consistency of a file system is necessary to relate applications and data used by those applications. In a data storage system, hundreds of files may be created, modified, and deleted on a regular basis. Each time a file is modified, the data storage system performs a series of file system updates. These updates, when written to a disk storage reliably, yield a consistent file system.

SUMMARY OF THE INVENTION

A method is used in managing log transactions in storage systems. A first portion of a transaction log space is allocated from a persistent journal associated with a file system to a first core of a multi-core storage processor and a second portion of the transaction log space is allocated from the persistent journal to a second core of the multi-core storage processor. A set of per-core bitmaps is used for allocating a set of transaction log entries from the persistent journal. Each per-core bitmap is associated with a respective core of the multi-core storage processor. A per-core bitmap of the set of per-core bitmaps associated with a core of the multi-core storage processor is used for allocating a transaction log entry for a write request performed by the core.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
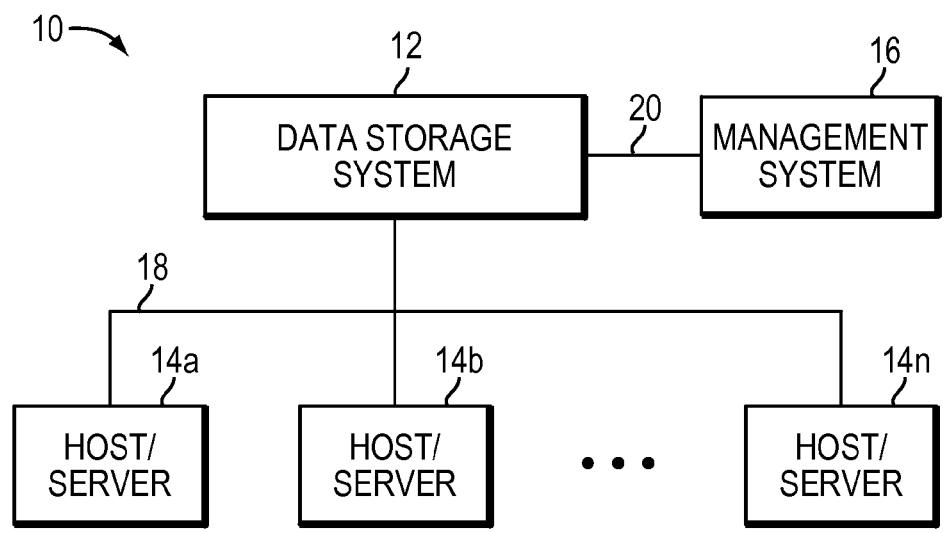
FIGS. 1-3 are examples of an embodiment of a computer system that may utilize the techniques described herein.

Described below is a technique for use in managing log transactions in storage systems, which technique may be used to provide, among other things, allocating a first portion of a transaction log space from a persistent journal associated with a file system to a first core of a multi-core storage processor and a second portion of the transaction log space from the persistent journal to a second core of the multi-core storage processor, and using a set of per-core bitmaps for allocating a set of transaction log entries from the persistent journal, where each per-core bitmap is associated with a respective core of the multi-core storage processor, where a per-core bitmap of the set of per-core bitmaps associated with a core of the multi-core storage processor is used for allocating a transaction log entry for a write request performed by the core.

Generally, an I/O operation (e.g., read request, write request) directed to a file may either be a cached I/O or an uncached I/O. Typically, in case of a cached I/O operation, data associated with the cached I/O is cached in a volatile memory (e.g., a buffer cache pool) of a data storage system. In such a case, a write I/O request is executed by writing the data to a buffer of a buffer cache pool and writing the contents of the buffer to a persistent storage either before returning a successful acknowledgement to a client or at a later time based on whether the write I/O request is a stable write request or an unstable write request. Further, in such a case, a read I/O request is executed by reading data from a persistent storage into a buffer of the buffer cache pool if the data is not already cached and completing the read I/O request by reading the data from the buffer. Generally, an uncached interface can be turned on or off per file system as a mount-time option. Further, when a file system is mounted with an option indicating an uncached I/O, a read I/O request is performed in a similar way a read I/O request of a cached I/O operation is performed.

Further, typically a write I/O operation may be a stable write or an unstable write. In case of an unstable write I/O operation, a data storage system does not commit data associated with the unstable write I/O operation to a persistent storage before acknowledging completion of the write I/O request to a client but writes data to an in-memory buffer in a volatile memory cache and flushes the data to the persistent storage at a later time. A process of flushing data includes writing the data to a persistent storage.

Generally, write I/O operations on large file systems often includes modification of existing contents of files of such large file systems, and/or writing data to a portion of a storage that is pre-allocated for such large file systems. Generally, a data transaction log and a global data cache are used to improve I/O performance and decrease write latency of write I/O operations by caching changes to data of a file in the global data cache, logging the changes in the data transaction log, flushing (also referred to herein as "committing") the changes to a storage device at a later time, and recovering the file, if required, by using information stored in the data transaction log. Thus, caching changes to data of a file of a file system and storing the changes in a data transaction log of a data storage system instead of modifying on-disk contents of the file system as part of a write I/O operation enables the data storage system to reduce the number of transaction to a storage disk thereby reducing a write latency of the write I/O operation and increasing I/O performance for a client and/or host system of the data storage system. Further, a data transaction log for a file system is created in a non-volatile memory of a data storage system such that the data transaction log resides with in the address space of the file system thereby allowing an efficient recovery of the file system.

Further, flushing data to on-disk contents of a file system stored on a persistent storage is delayed until a specific criteria (e.g., threshold) is met. Thus, a write latency indicating the amount of time it takes to write data is reduced by delaying writing data to a persistent storage at a later time. Further, committing data to a file system may be performed by one or more background process (e.g. threads). Further, a background process uses buffers cache blocks cached in the global data cache and information of the data transaction log for committing data of the buffer cache blocks to a file system thereby reducing latency of write I/O operations because the data is committed to the storage device after providing acknowledgement of completion of a write I/O request to a client.

Generally, metadata changes of a file system resulting from an I/O request may directly be written to the file system stored on a disk, or recorded in a file system transaction log associated with the file system. A file system transaction log is used to improve performance, reliability, and recovery times of file systems. A file system transaction log for a file system offers increased reliability, because the file system transaction log may replicate some or all of the file system metadata which can be applied to the file system at a later time in order to make the file system metadata consistent with changes applied to data of the file system.

Typically, a file system transaction log only stores changes to metadata (such as inodes, directories, allocation maps) of a file system. If a file server shuts down without a failure, the file system transaction log can be discarded, because the file system stored on a persistent storage in such a case is consistent and includes all metadata changes stored in the file system transaction log. However, when file server shuts down due to a failure, the file system transaction log is used to rebuild the file system in order to restore the file system to a consistent state. Generally, all write operations resulting in changes to metadata of a file system are first stored in the file system transaction log and corresponding metadata structures stored on a persistent storage are updated at a later time when metadata changes stored in a cache are written (or flushed) to the persistent storage. Thus, metadata structures stored on the persistent storage may contain stale data that is not consistent with metadata changes stored in the file system transaction log. Therefore, in such a case, the metadata changes stored in the file system transaction log are applied to the metadata structures stored on the persistent disk to recover the file system to a consistent state. The process of recovering a file system to a consistent state by applying metadata changes stored in a file system transaction log to a persistent storage is known as "replay of a file system transaction log".

A data storage system may write transaction log entries to a transaction log concurrently by using a set of in-memory lists maintained for a set of cores of a multi-core processor.

Thus, transaction log entries may be written to a transaction log concurrently with each other using each core of a multi-core processor thereby reducing an overhead involved in writing multiple transaction log entries to the transaction log. However, even though writing transaction log entries to a transaction log concurrently improves throughput of I/O operations, it introduces some challenges with regards to allocating space for such transaction log entries.

Conventionally, a global bitmap is maintained for a file system for allocating transaction log space for transaction log entries that are written to a transaction log associated with the file system. In such a conventional system, concurrent access to a single global bitmap by multiple threads results into contention of a lock used for accessing the global bitmap. Thus, in such a conventional system, different threads from different cores of a multi-core processor is unable to take advantage of the different cores of the multi-core processor because every threads may have to wait to acquire a single lock of a single global bitmap for allocating storage space for transaction log entries for a transaction log that is managed by the different threads executing on the different cores. Further, in such a conventional system, writing single-sector transaction log headers from different threads in different cores of a multi-core processor introduces a large amount of overhead in a multiple-core cache ("MCC") layer of a system. Thus, in such a conventional system, using more than one core of a multi-core processor for processing transaction log entries managed by a single global bitmap causes lock contention, memory and cache contention.

By contrast, in at least some implementations in accordance with the technique as described herein, the use of managing log transactions in storage systems technique enables a data storage system to allocate transaction log entries to a transaction log concurrently by using a set of per-core bitmaps maintained for a set of cores of a multi-core processor. Thus, in at least one embodiment of the current technique, each core of a multi-core processor uses a per-core bitmap for allocating transaction log entries from a portion of transaction log space that has been pre-allocated for a core thereby reducing an overhead involved in acquiring and releasing a single lock of a global bitmap.

In at least some implementations in accordance with the current technique as described herein, the use of the managing log transactions in storage systems technique can provide one or more of the following advantages: improving memory and storage utilization by each core of a multi-core processor using a per-core bitmap for allocating and managing transaction log entries for a transaction log, improving I/O performance by reducing an overhead involved in managing a bitmap for allocating storage space for transaction log entries to a transaction log, improving performance of a recovery of a file system by efficiently replaying a transaction log associated with the file system, and improving response time of applications by efficiently managing log transactions in a storage system.

Referring now to FIG. 1, shown is an example of an embodiment of a computer system such as a data storage system that may be used in connection with performing the technique or techniques described herein. A data storage system may be a block based storage system 12 as described herein in FIG. 1. Further, a data storage system may be a file based data storage system as described herein below in FIG. 2. Further, a data storage system may include a block based data storage system component and a file based data storage system component.

While the block based storage system 12 may be configured in a variety of ways, in at least one embodiment, the block based storage system 12 is configured as a storage area network (SAN), such as a CLARiiON™ system, as produced by EMC Corporation of Hopkinton, Massachusetts. While a file based storage system may be configured in a variety of ways, in at least one embodiment, the file based storage system is configured as a network attached storage (NAS) system, such as a Celerra™ system produced by EMC Corporation of Hopkinton, Mass.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the block based data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the block based data storage systems over an iSCSI or fibre channel connection and the management system may communicate with the block based data storage systems over a separate network connection using TCP/IP. It should be noted that although FIG. 1 illustrates communications between the hosts and block based data storage systems being over a first connection, and communications between the management system and the block based data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the block based data storage systems 12 to perform a data operation. For example, an application executing on one of the host computers 14a-14n may perform a read or write operation resulting in one or more data requests to the block based data storage systems 12.

The management system 16 may be used in connection with management of the block based data storage systems 12. The management system 16 may include hardware and/or software components. The management system 16 may include one or more computer processors connected to one or more I/O devices such as, for example, a display or other output device, and an input device such as, for example, a keyboard, mouse, and the like. A block based data storage system manager may, for example, view information about a current storage volume configuration on a display device of the management system 16. The manager may also configure a block based data storage system 12, for example, by using a management software to define a logical grouping of logically defined devices, referred to elsewhere herein as a storage group (SG), and restrict access to the logical group.

An embodiment of the block based data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). It should be noted that each of the data storage systems may operate stand-alone, or may also included as part of a storage area network (SAN) that includes, for example, other components such as other data storage systems, file based data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the block based data storage system 12 may also include other components than as described for purposes of illustrating the techniques herein.

Figure 2:
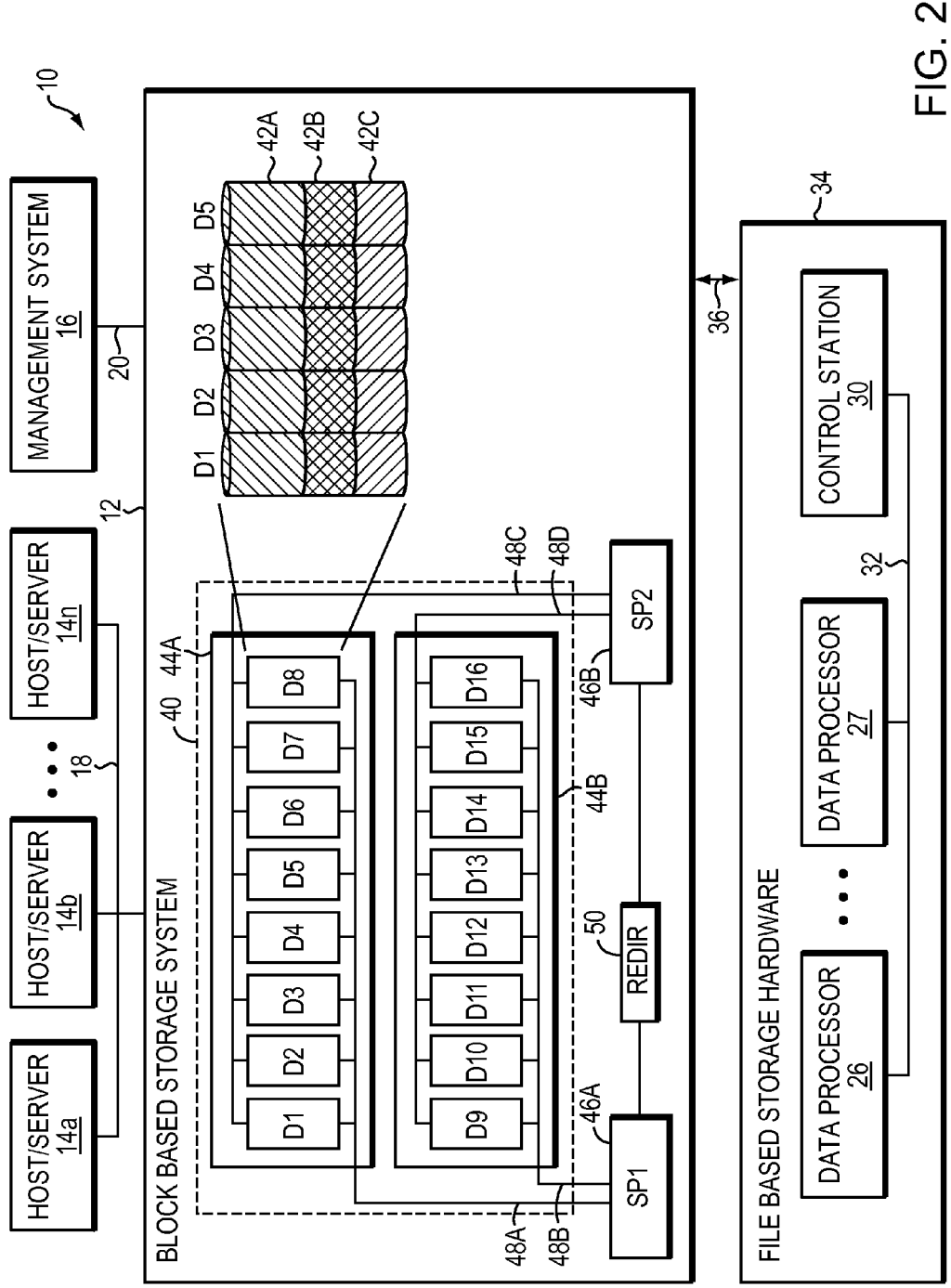

Referring now to FIG. 2, shown is an example of an embodiment of a computer system such as a unified data storage system that may be used in connection with performing the technique or techniques described herein. As shown, the unified data storage system 10 includes a block based storage system 12 and file based storage hardware 34. While the block based storage system 12 may be configured in a variety of ways, in at least one embodiment, the block based storage system 12 is configured as a storage area network (SAN), such as a VNX™ or VNXe™ system, as produced by EMC Corporation of Hopkinton, Mass. While the file based storage hardware 34 may be configured in a variety of ways, in at least one embodiment, the file based storage hardware 34 is configured as a network attached storage (NAS) system, such as a file server system produced by EMC Corporation of Hopkinton, Mass., configured as a header to the block based storage system 12.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

In at least one embodiment of the current technique, block based data storage system 12 includes multiple storage devices 40, which are typically hard disk drives, but which may be tape drives, flash memory, flash drives, other solid state drives, or some combination of the above. In at least one embodiment, the storage devices may be organized into multiple shelves 44, each shelf containing multiple devices. In the embodiment illustrated in FIG. 2, block based data storage system 12 includes two shelves, Shelf1 44A and Shelf2 44B; Shelf1 44A contains eight storage devices, D1-D8, and Shelf2 also contains eight storage devices, D9-D16.

Block based data storage system 12 may include one or more storage processors 46, for handling input/output (I/O) requests and allocations. Each storage processor 46 may communicate with storage devices 40 through one or more data buses 48. In at least one embodiment, block based data storage system 12 contains two storage processors, SP1 46A, and SP2 46B, and each storage processor 46 has a dedicated data bus 48 for each shelf 44. For example, SP1 46A is connected to each storage device 40 on Shelf1 44A via a first data bus 48A and to each storage device 40 on Shelf2 44B via a second data bus 48B. SP2 46B is connected to each storage device 40 on Shelf1 44A via a third data bus 48C and to each storage device 40 on Shelf2 44B via a fourth data bus 48D. In this manner, each device 40 is configured to be connected to two separate data buses 48, one to each storage processor 46. For example, storage devices D1-D8 may be connected to data buses 48A and 48C, while storage devices D9-D16 may be connected to data buses 48B and 48D. Thus, each device 40 is connected via some data bus to both SP1 46A and SP2 46B. The configuration of block based data storage system 12, as illustrated in FIG. 2, is for illustrative purposes only, and is not considered a limitation of the current technique described herein. Thus, it should be noted that data storage system 12 may include any number of storage processors.

In addition to the physical configuration, storage devices 40 may also be logically configured. For example, multiple storage devices 40 may be organized into redundant array of inexpensive disks (RAID) groups. Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 2, storage devices D1-D5, is sub-divided into 3 logical units, LU1 42A, LU2 42B, and LU3 42C. The LUs 42 may be configured to store a data file as a set of blocks striped across the LUs 42.

The unified data storage system 10 includes a file based storage hardware 34 that includes at least one data processor 26. The data processor 26, for example, may be a commodity computer. The data processor 26 sends storage access requests through physical data link 36 between the data processor 26 and the block based storage system 12. The data link 36 may be any one or more of a variety of networks or other type of communication connections as known to those skilled in the art. The processor included in the data processor 26 may be any one of a variety of proprietary or commercially available single or multiprocessor system, such as an Intel-based processor, or other type of commercially available processor able to support traffic in accordance with each particular embodiment and application. Further, file based storage hardware 34 may further include control station 30 and additional data processors (such as data processor 27) sharing storage device 40. A dual-redundant data link 32 interconnects the data processors 26, 27 to the control station 30. The control station 30 monitors a heartbeat signal from each of the data processors 26, 27 in order to detect a data processor failure. If a failed data processor cannot be successfully re-booted, the control station 30 will "fence off" the failed data processor and re-assign or fail-over the data processing responsibilities of the failed data processor to another data processor of the file based storage hardware 34. The control station 30 also provides certain server configuration information to the data processors 26, 27. For example, the control station maintains a boot configuration file accessed by each data processor 26, 27 when the data processor is reset.

The data processor 26 is configured as one or more computerized devices, such as file servers, that provide end user devices (not shown) with networked access (e.g., NFS and CIFS facilities) to storage of the block based storage system 12. In at least one embodiment, the control station 30 is a computerized device having a controller, such as a memory and one or more processors. The control station 30 is configured to provide hardware and file system management, configuration, and maintenance capabilities to the data storage system 10. The control station 30 includes boot strap operating instructions, either as stored on a local storage device or as part of the controller that, when executed by the controller following connection of the data processor 26 to the block based storage system 12, causes the control station 30 to detect the automated nature of a file based storage hardware installation process and access the data processor 26 over a private internal management network and execute the file based hardware installation process.

The data storage system 10 also includes journal such as a file system transaction log which may include a persistent log or a persistent file that may be used to update metadata of a file system stored on a persistent storage. Generally, any change in metadata of a file system may first be written to a file system transaction log. Metadata information stored in the file system transaction log is later used to recover the file system when file server 34 reboots due to a failure. Upon reboot of file server 34, the file system transaction log is inspected to find a last valid transaction recorded in the file system transaction log, and the last valid transaction is applied to the file system stored on a persistent storage for updating metadata of the file system by using metadata information stored in the file system transaction log.

Figure 3:
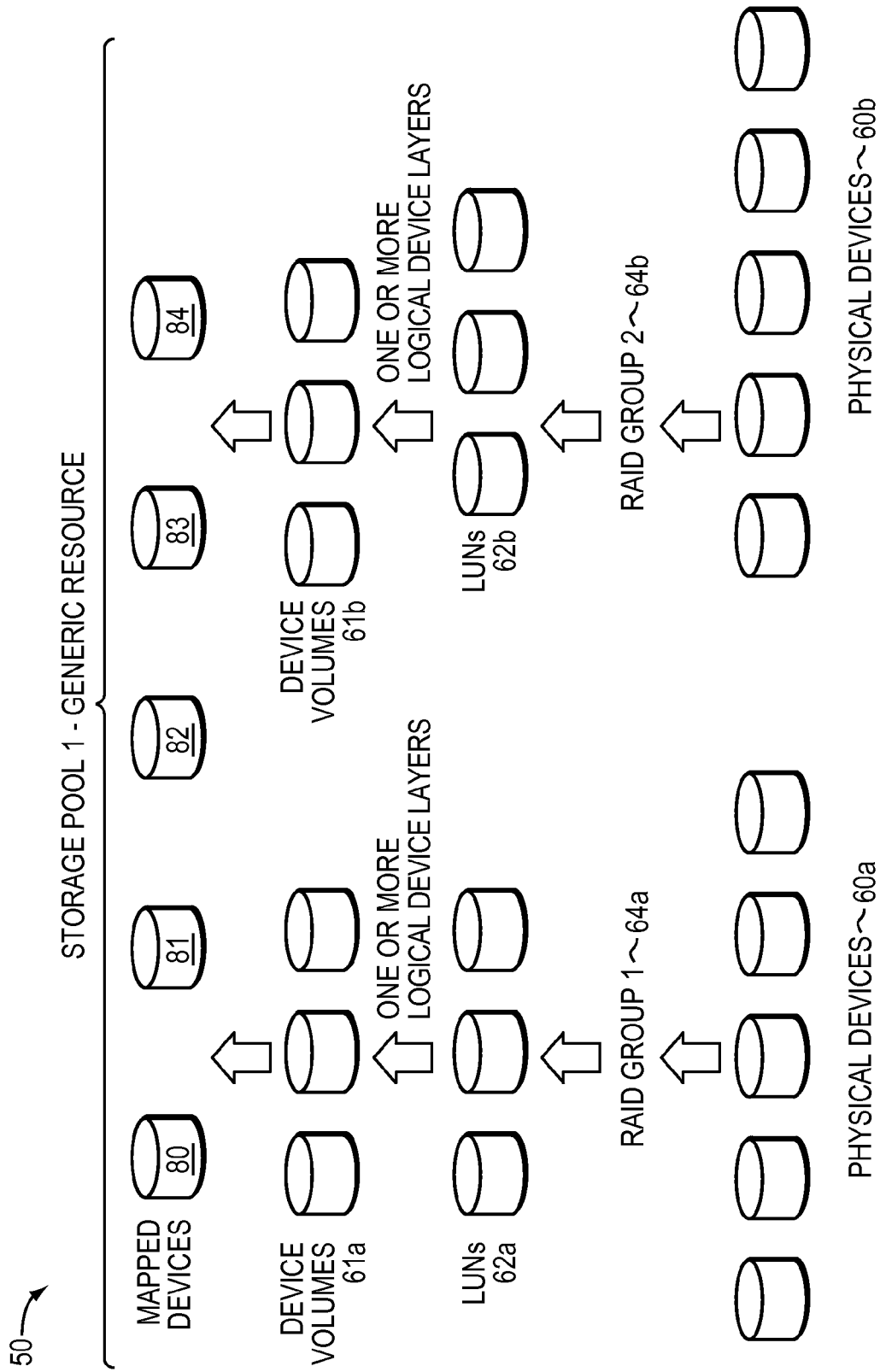

FIG. 3 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62.

The data storage system 12 may also include one or more mapped devices 78-84. A mapped device (e.g., "thin logical unit", "direct logical unit") presents a logical storage space to one or more applications running on a host where different portions of the logical storage space may or may not have corresponding physical storage space associated therewith. However, the "thin logical unit" ("TLU") mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the "thin logical unit" ("TLU") mapped device results in either a null pointer (or equivalent) indicating that no corresponding physical storage space has yet been allocated, or results in a reference to a data device which in turn references the underlying physical storage space.

Figure 4:
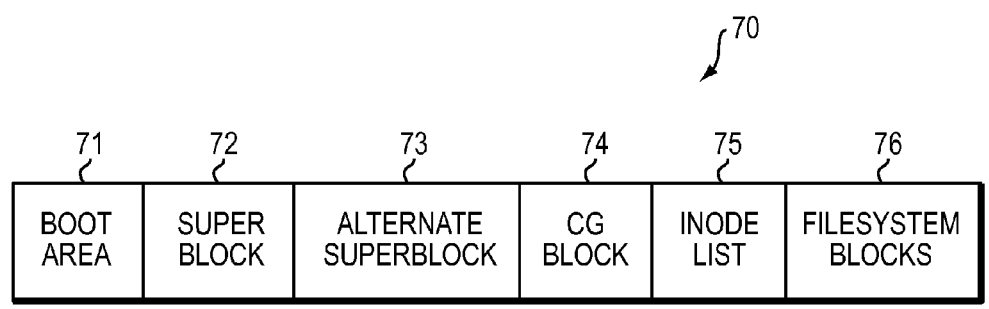
FIGS. 4-9 are diagrams illustrating in more detail components that may be used in connection with techniques herein.

Referring to FIG. 4, shown is a representation of an on-disk layout of a file system that may be included in an embodiment using the current techniques described herein. A file system 70 includes a boot area 71, a superblock 72, an alternate superblock 73, Cylinder Group (CG) block 74, an inode list 75, and file system blocks 76. The boot area 71 may contain code for booting an operating system of file server 23. The superblock 72 and alternate super block 73 contains attributes and metadata of the file system. Cylinder Group block 74 contains metadata information pertaining to cylinder groups of the file system. Inode list 75 includes the list of all inodes of each file that is present in the file system.

File systems typically include metadata describing attributes of a file system and data from a user of the file system. A file system contains a range of file system blocks that store metadata and data. In at least some embodiments of the current technique, the file system block may be 8 kilobytes (KB) in size. Further, a user of data storage system 10 creates files in a file system.

A file system 70 includes one or more file system blocks 76. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. However, it should be noted that a file system may be organized based on any one of the known mapping techniques such as an extent based binary tree mapping mechanism.

Generally, each file system data block of a file is associated with a respective mapping pointer. A mapping pointer of a file system block points to the file system block and includes metadata information for the file system block. A file system block associated with a mapping pointer may be a data block or an indirect data block which in turn points to other data blocks or indirect blocks. A mapping pointer includes information that help map a logical offset of a file system block to a corresponding physical block address of the file system block.

Figure 5:
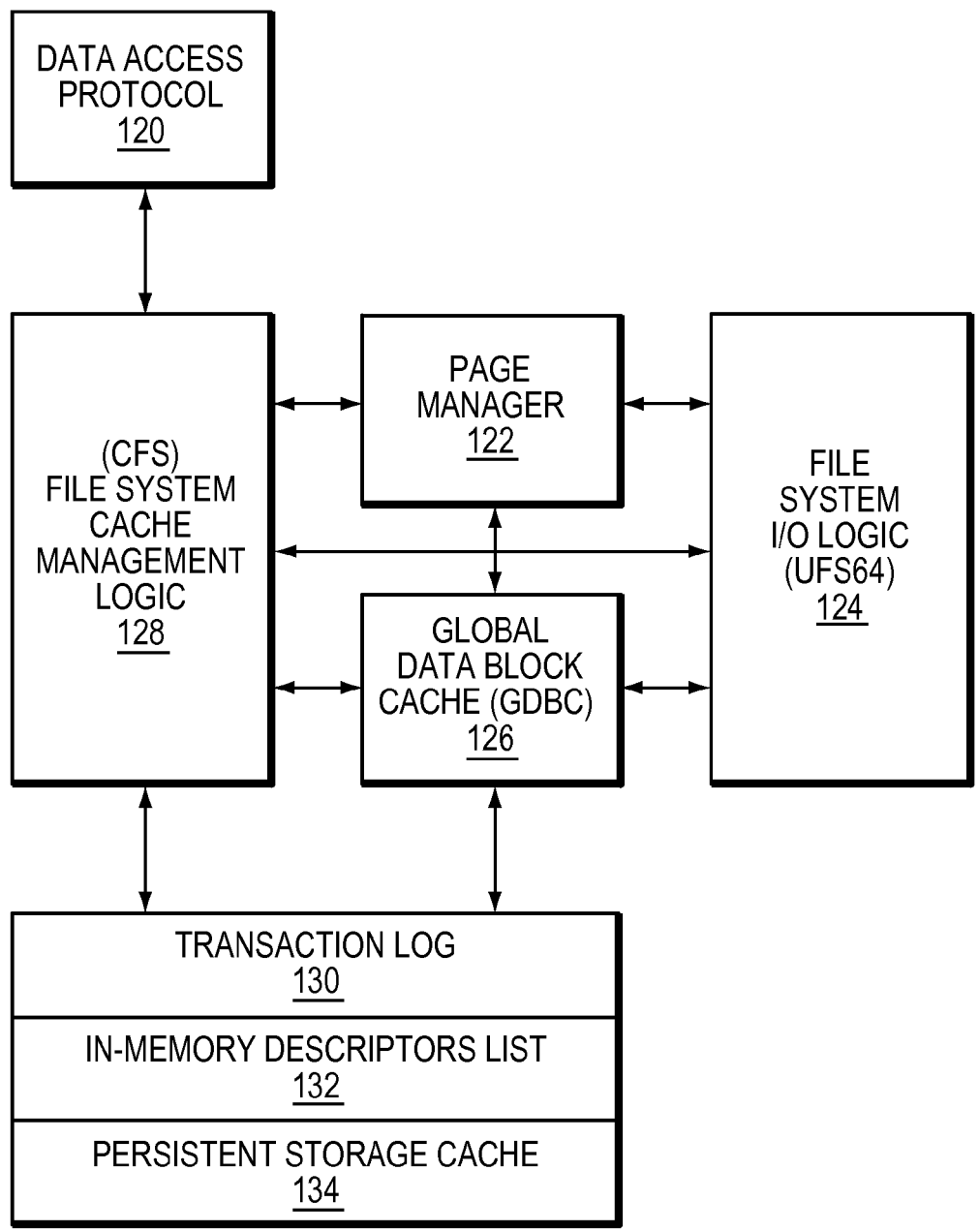

Referring to FIG. 5, shown is a detailed representation of components that may be included in an embodiment using the techniques described herein. In at least one embodiment of the current technique, a client access a file system using any one of data access protocols 120 (such as CIFS 42, NFS 41, and iSCSI 51) by issuing an I/O request (e.g., read, write) to the file system. With reference also to FIGS. 1-4, file system I/O logic 124 (also referred to herein as "UFS64") provides functionality for creating and hosting a file system in a data storage system. Further, file system I/O logic 124 provides a set of interfaces for accessing and managing files of a file system, and maintaining consistent mapping for the files of the file system. File system cache management logic 128 (also referred to herein as "Common File System" or "CFS") provides a functionality and a set of interfaces for accessing and managing files of a file system. CFS 128 includes mapping information that maps an offset of a file to a global data block cache descriptor associated with a data block that is cached in the global data block cache 126.

In at least one embodiment of the current technique, file server 34 includes a volatile memory module that can be viewed as an array of pages as the volatile memory is apportioned into fixed size frames, or pages, for organizational purposes. The terms 'frame' and 'page' will be used interchangeably herein. For example, in at least one embodiment of the current technique, the volatile memory may be apportioned into pages of 8 kilobytes (KB). Alternatively, in another embodiment of the current technique, the volatile memory may be apportioned into pages of 4 kilobytes (KB). Further, in another embodiment of the current technique, the volatile memory may be apportioned into pages of 4 megabytes (MB).

A first portion of the pages of the volatile memory module are allocated to data structures that are used to support an operating system of the file server 34. A second portion of the pages of the volatile memory module are allocated to a buffer cache pool, where the buffer cache pool includes a collection of buffer cache blocks such that each buffer cache block may correspond to a page of the volatile memory.

The remaining pages of the volatile memory module are so-called 'free' pages available for allocation to applications. The file server 34 communicates with clients coupled to the file server via network interface 30. Clients execute applications which access file systems stored on storage devices via the file server 34. A storage device on which a file system is stored is apportioned into fixed size file system blocks, for organizational purposes.

A file system contains a range of file system blocks that store metadata and data. File system blocks are allocated from a storage device for creating files and storing metadata of a file system. In at least some embodiments of the current technique, the file system block may be 8 kilobyte (KB) in size. Thus, in at least one embodiment of the current technique, there may exist 1-1 correspondence between a file system block and a page. However, it should be noted that there may not be a 1-1 correspondence between a file system block and a page.

Thus, the buffer cache pool of a data storage system is created by apportioning a portion of a volatile memory module of the data storage system into buffer cache blocks (also referred to as "buffer cache page") in such a way that each buffer cache block is represented by a buffer cache descriptor. The buffer cache pool is created when file server 34 is initialized during a boot sequence. Further, during initialization of file server 34, a buffer cache descriptor table is created for managing buffer cache blocks of the buffer cache pool. The buffer cache descriptor table includes a buffer cache descriptor entry for each buffer cache block created for the buffer cache pool. A buffer cache descriptor entry associated with a buffer cache block includes information about the buffer cache block. The information may include the physical address of the buffer cache block, as well as an identifier of a buffer cache queue to which the buffer cache block is allocated. The buffer cache pool provides buffer cache blocks to applications for storing data and/or metadata of a file system. The buffer cache pool manages allocation, caching and deallocation of buffer cache blocks.

In at least one embodiment of the current technique, page manager 122 allocates pages of the volatile memory module and provides the pages to applications. An application may require one or more pages of memory. Page manager 122 provides a common set of interfaces for accessing buffer cache blocks of the buffer cache pool, In at least one embodiment of the current technique, global data block cache 126 ("GDBC") caches a set of data blocks of a file system in a volatile memory of file server 34 by managing a set of global data block cache descriptors ("also referred to herein as "GDBC descriptor") such that each global data block cache descriptor may be mapped to a buffer cache block of the buffer cache pool such that the buffer cache block may store a data block of the set of data blocks. Thus, a GDBC descriptor entry functions in a similar way a buffer cache descriptor entry functions as described above herein. Similarly, a global metadata cache caches a set of metadata blocks of a file system in a volatile memory of file server 34 by managing a set of global data block cache descriptors ("also referred to herein as "GDBC descriptor") such that each global data block cache descriptor may be mapped to a buffer cache block of the buffer cache pool such that the buffer cache block may store a metadata block of the set of metadata blocks. Further, a data or metadata block of a file of a file system that is cached in the GDBC 126 or a global metadata cache, may also be stored in a persistent journal such as data transaction log 130, a file system transaction log associated with the file system in a case where the data and/or metadata block is a dirty block indicating that the dirty block has not been flushed to a storage device yet. The transaction log 130 is stored in a nonvolatile memory module that is persistent across reboots of file server 34. Further, GDBC 126 and global metadata caches provides CFS 128 and file system I/O logic 124 consistent access to a set of data blocks and metadata blocks cached in the buffer cache pool. Further, GDBC 126 uses a reference count mechanism and a hint mechanism for managing a set of buffer cache data blocks. Further, the size of global data block cache 126 is based on the size of the volatile memory module of file server 23.

In at least one embodiment of the current technique, global data block cache 126 is initialized at the time file server 34 is initialized. The global data cache 126 is created in a volatile (e.g., Direct Random Access Memory (DRAM) of file server 34. Further a data transaction log 130 is created for each file system when storage for the file system is provisioned. The data transaction log is created in a nonvolatile memory of file server 34. Further, in at least one embodiment of the current technique, a nonvolatile memory may include a flash memory (e.g. solid state drives, EEPROM (electrically erasable programmable read-only memory)).

In at least one embodiment of the current technique, transaction log 130 (e.g., data transaction log, file system transaction log) provides a functionality for logging a set of data and/or metadata blocks associated with write I/O requests to a file system such that the set of data and/or metadata blocks are stored in a nonvolatile memory of file server 34. Further, transaction log 130 provides a set of interfaces for storing a data and/or metadata block in a nonvolatile memory and maintaining a transaction log descriptor (e.g., data log descriptor) associated with the data and/or metadata block in a volatile memory of file server 34. Further, transaction log 130 provides a common set of interfaces for accessing a set of data and/or metadata blocks of a file system irrespective of how the file system is implemented in a data storage system. Further, transaction log 130 enables file server 34 to recover a file system when the file system is remounted. A file system may be remounted either after reboot of file server 34 or after successful unmount of the file system. Thus, in-memory descriptors list 132 manages a set of transaction log descriptors associated with a set of data and/or metadata blocks that are cached in a nonvolatile memory (such as persistent storage cache 134).

Further, in at least one embodiment of the current technique, transaction log 130 provides a functionality to cache data and/or metadata of a file system in a nonvolatile memory of a data storage system such that the data storage system may be a file based data storage system or a block based data storage system. In case of a block based data storage system, transaction log 130 may use a persistent storage such as a storage processor cache for storing contents of a file system. In case of a file based data storage system such as file server 34, a predefined address space of a file system is reserved for transaction log 130. The storage for the predefined address space may be provisioned from a file system volume. Further, data and/or metadata stored in transaction log 130 persists across reboots of a data storage system. Additionally, a transaction log is associated with a single file system. Thus, transaction log 130 is available for caching contents of a file system when the filesystem is mounted because the transaction log is part of the address space of the file system.

Generally, if a file system data block stored on a persistent storage includes an updated version of data compared to data stored in an in-memory buffer (e.g., a buffer cache block of a buffer cache pool) associated with the file system data block, the in-memory buffer is indicated as dirty buffer (also referred to herein as "dirty metadata buffer", and "dirty data buffer"). Thus, in such a case, contents of the dirty in-memory buffer are flushed to the persistent storage at a later time in order to ensure that a single location on the persistent storage stores the up-to-date data and/or metadata for the file system data block. Typically, a dirty buffer results from an unstable (also referred to as "asynchronous") write operation. Further, a background process is used to flush dirty in-memory buffers created by asynchronous concurrent write I/O operations thereby reducing latency of the asynchronous write I/O operations.

The process of flushing data commits the data from dirty in-memory buffers that are cached in file system cache 128 to a file system stored on a persistent storage. A new overlapping write I/O request to any one of the dirty buffers may generate a copy of the dirty buffer to which the overlapping write I/O request is targeted to. Then, the new overlapping write I/O request updates the copy of the dirty buffer in order to ensure that only the data that has been acknowledged to a client is written to the persistent storage.

Figure 6:
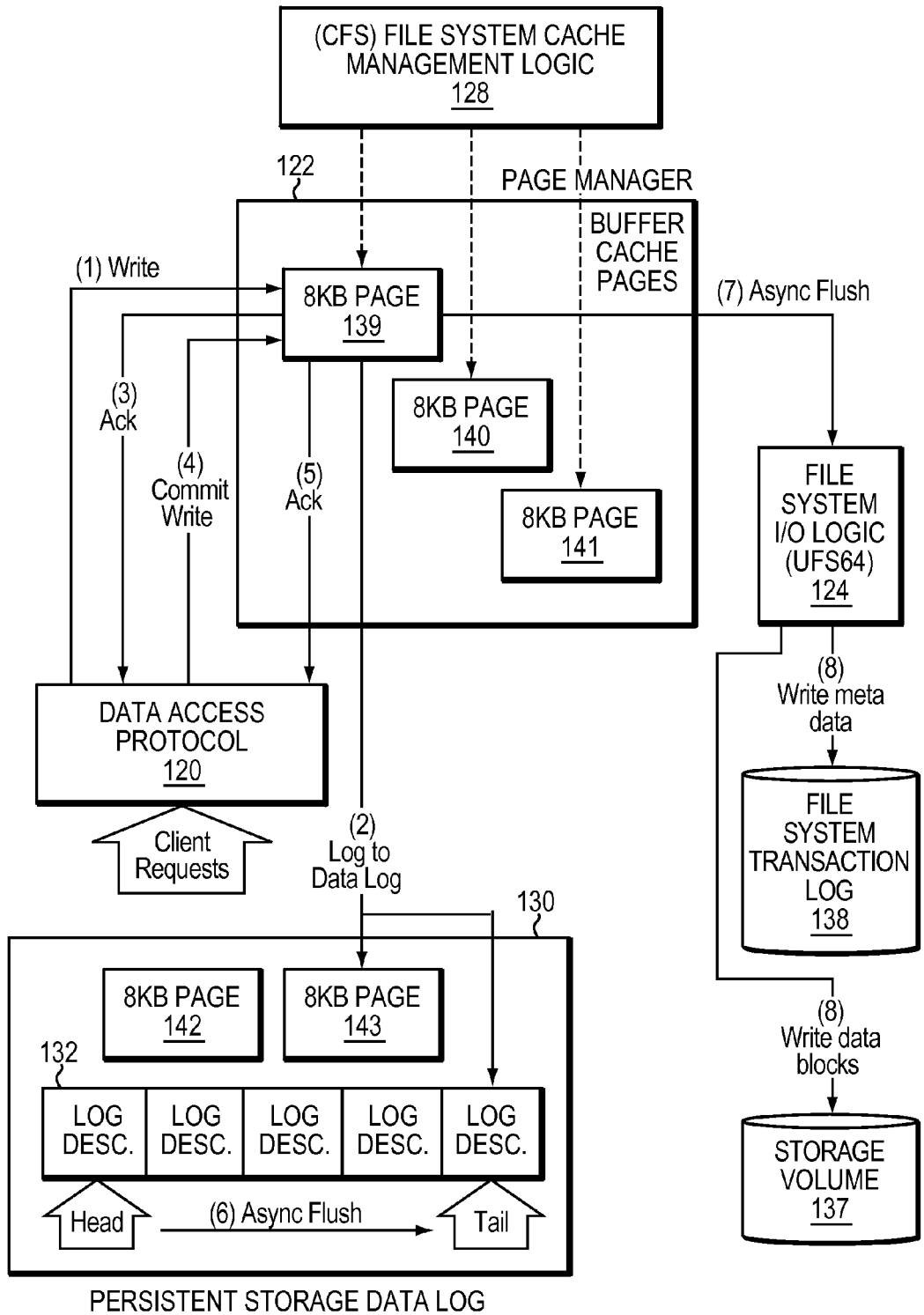

Referring to FIG. 6, shown is a detailed representation of components that may be included in an embodiment using the techniques described herein. A client issues an I/O request (e.g., read, write) to a file system using a data access protocol 120 (such as CIFS 42, NFS 41). The I/O request may attempt to modify on-disk contents of a file of the file system. In such a case, writing data associated with an I/O request to a data transaction log stored on a persistent storage created from the fastest storage devices available and acknowledging the I/O request to a client before writing data to the file stored on a storage device and metadata to a file system transaction log shifts the overhead involved in writing to the storage device and the file system transaction log to a background process which executes separate from the I/O request. Further, in at least one embodiment of the current technique, a background process (also referred to as "flush process") commits data and/or metadata to the file system at a later time.

Thus, for example, in FIG. 6, after receiving the I/O request from the client, data associated with the I/O request (e.g., write) is cached in a buffer cache block 139 of the buffer cache pool. Further, the data is written to a data block 142 and stored in a data transaction log 130 associated with the file system. Further, information regarding the data block 142 and the buffer cache block 139 is stored in a global data block cache descriptor. Additionally, a data log descriptor 132 is created and associated with the global data block cache descriptor. Further, the data log descriptor 132 is added to a list of log descriptors that are flushed by a background process at a later time. The client sends the request for an acknowledgement of completion of the I/O request, and the request to commit the data to a storage device. The data storage system provides the acknowledgement to the client indicating that the I/O request has completed successfully. After providing the acknowledgment, a background flush process writes the data cached in the buffer cache block 139 to the storage device 137. The background flush process may be executed at a specified time based on a criteria such as a threshold value. The background flush process writes data stored in the buffer cache block 139 to the storage volume 137 and writes metadata associated with the data to file system transaction log 138.

In at least one embodiment of the current technique, a data storage system 12 on which a file system is organized may include a multi-core storage processor (also referred to herein as simply "multi-core processor"). Generally, a multi-core processor is a single computing component with two or more independent actual central processing units (also referred to herein as "cores"), which are the units that read and execute program instructions. The instructions are generally ordinary CPU instructions, but the two or more independent cores can run multiple instructions at the same time, increasing overall speed for programs configured for concurrent execution. Thus, a multi-core processor architecture is a type of architecture where a single physical processor includes the core logic of two or more processors where the two or more processors are packaged into a single integrated circuit ("IC"). For example, a dual-core processor has two cores, a quad-core processor includes four cores, a hexa-core processor includes six cores and so on. Thus, a multi-core processor implements multiprocessing in a single physical package. Further, improvements in performance gained by the use of a multi-core processor depends on how an application executing on the multi-core processor uses and implements software algorithms and logic. In particular, possible performance gains are limited by the fraction of an application logic that can be run in parallel simultaneously on multiple cores of a multi-core processor.

Further, transaction log entries for a file system are distributed across one or more cores of a multi-core processor such that each core of the multi-core processor manages a subset of the transaction log entries concurrently. Further, in at least one embodiment of the current technique, transaction log entries managed by one or more cores of a multi-core processor are written to a transaction log organized on a persistent storage concurrently. Further, in at least one embodiment of the current technique, when a transaction log organized on a persistent storage is replayed, transaction log entries are recreated in one or more in-memory lists associated with one or more cores of a multi-core processor.

Figure 7:
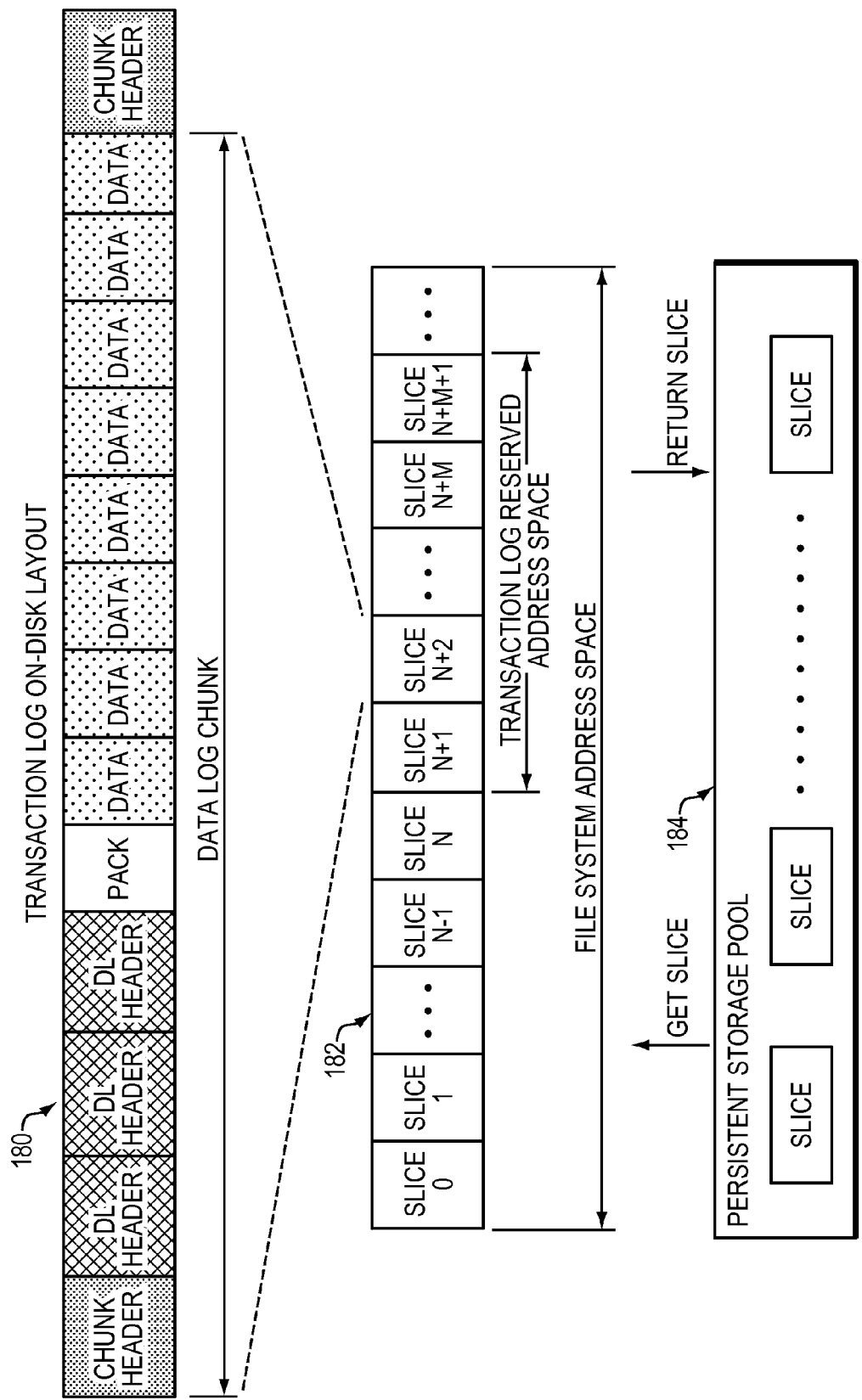

Referring to FIG. 7, shown is a detailed representation of components that may be included in an embodiment using the techniques described herein. In example 180, FIG. 7 illustrates an example on-disk layout of a transaction log (e.g., data transaction log) associated with a file system. A storage space is reserved in an address space 182 of a file system for storing a transaction log for that file system such that when the file system is mounted in a data storage system, a slice (also referred to herein as "data log slice") is automatically provisioned (or "allocated") and assigned to the transaction log. Thus, an address space of a transaction log for a file system includes a set of slices such that the slices provisioned for the transaction log becomes part of an address space of the file system. For example, file system address space 182 includes a set of slices (e.g., "m" number of slices) such that slice 0 to slice "n" includes data and/or metadata of the file system and the transaction log 180 is stored from slice "n+1" to slice "n+m" where n and m can be any numbers greater than or equal to 1.

In at least one embodiment of the current technique, the size of a transaction log slice may be less than 1 gigabytes (e.g., 256 megabytes). A set of slices are provisioned for each file system as transaction log slices from a storage pool 184 such that the file system may allocate a slice from the set of slices to a transaction log associated with the file system. Further, a file system may request a slice for a transaction log only when the file system needs storage space to cache data blocks in the transaction log. Further, a slice may be returned back to a storage pool when buffer cache blocks associated with data blocks of the slice are flushed from the global data cache to a storage device. Additionally, a slice for a transaction log may be selected from a storage tier of a storage pool such that the storage tier includes disks with best performance characteristics. It should be noted that a transaction log using the current technique may be used to store both data and metadata of a file system either in a same transaction log or different transaction logs.

Generally, a storage pool may be a collection of disks, which may include disks of different types. A storage pool may further be subdivided into slices; for example a 1 GB slice may be the allocation element for a logical unit. As well, a pool may be use synonymously with a storage tier. That is, both a storage tier and a pool may have storage devices of different performance capabilities and costs. As well, both may contain slices (also referred to as "data slices"). A slice may be considered the smallest element that can be tracked and moved. It may be advantageous to store the hot or most accessed data on the devices within the storage pool with the best performance characteristics while storing the cold or least accessed data on the devices that have slower performance characteristics.

Further, in at least one embodiment of the current technique, a transaction log is apportioned into a number of sections (also referred to herein as "chunks"). Each section of a transaction log may be of different size. Further a section of a transaction log includes a number of transaction log records. Further, a transaction log slice provisioned for a transaction log may store a number of sections based on the size of each section and the size of the transaction log slice. Alternatively, a section of a transaction log may require a number of transaction log slices to store contents of the section based on the size of the section and each transaction log slice. Each section of transaction log starts by storing a chunk header followed by a number of transaction log (also referred to herein as "TL") headers. For example, a section may include a chunk header followed by one thousand transaction log headers. The first portion of a section of a transaction log includes a chunk header and a set of transaction log headers. The first portion is referred to as a header portion. Further, the size of a header portion of each section is of the same size. The second portion of the section of the transaction log following the header portion is referred to as a record portion and includes a number of transaction log records. Each transaction log record includes a transaction log header and data such that the transaction log header includes information regarding the data. However, it should be noted that the transaction log may also include information regarding metadata of a file system. Because the size of data stored in a transaction log record may vary based on an I/O request, the size of the transaction log record varies as well based on the size of data. As a result, the size of a record portion of each section of a transaction log may vary based on the size of each transaction log record in the second portion. Consequently, the size of each section may vary based on the size of the record portion of the section. Thus, it should be noted that a section of a transaction log slice of a transaction log does not reside beyond a slice boundary and the transaction log slice starts with a chunk header.

Further, in at least one embodiment of the current technique, a transaction log write operation to a transaction log writes data to the record portion of a section of the transaction log. When the record portion of a section cannot store any more transaction log records, the header portion of the section is updated with a chunk header and a subset of transaction log headers that have been written to the record portion. Thus, the next transaction log header is written to the record portion of the next section. Further, in at least one embodiment of the current technique, transaction log records may be read from a transaction log and processed concurrently by one or more cores of a multi-core processor of a data storage system.

Further, in at least one embodiment of the current technique, a data storage system logs data associated with each write I/O operation to a transaction log by writing a transaction log header and the data and/or metadata to the transaction log. Further, in at least one embodiment of the current technique, a transaction log descriptor (also referred to herein as "TLD") tracks each modification performed on a set of data blocks and/or metadata blocks that are associated with a write I/O request. A write I/O request may modify multiple data blocks of a file such that each data block is associated with a global data block cache ("GDBC") descriptor entry which is cached in the global data block cache 126. Thus, a transaction log descriptor manages a list of GDBC entries that have been cached by a write I/O request.

Figure 8:
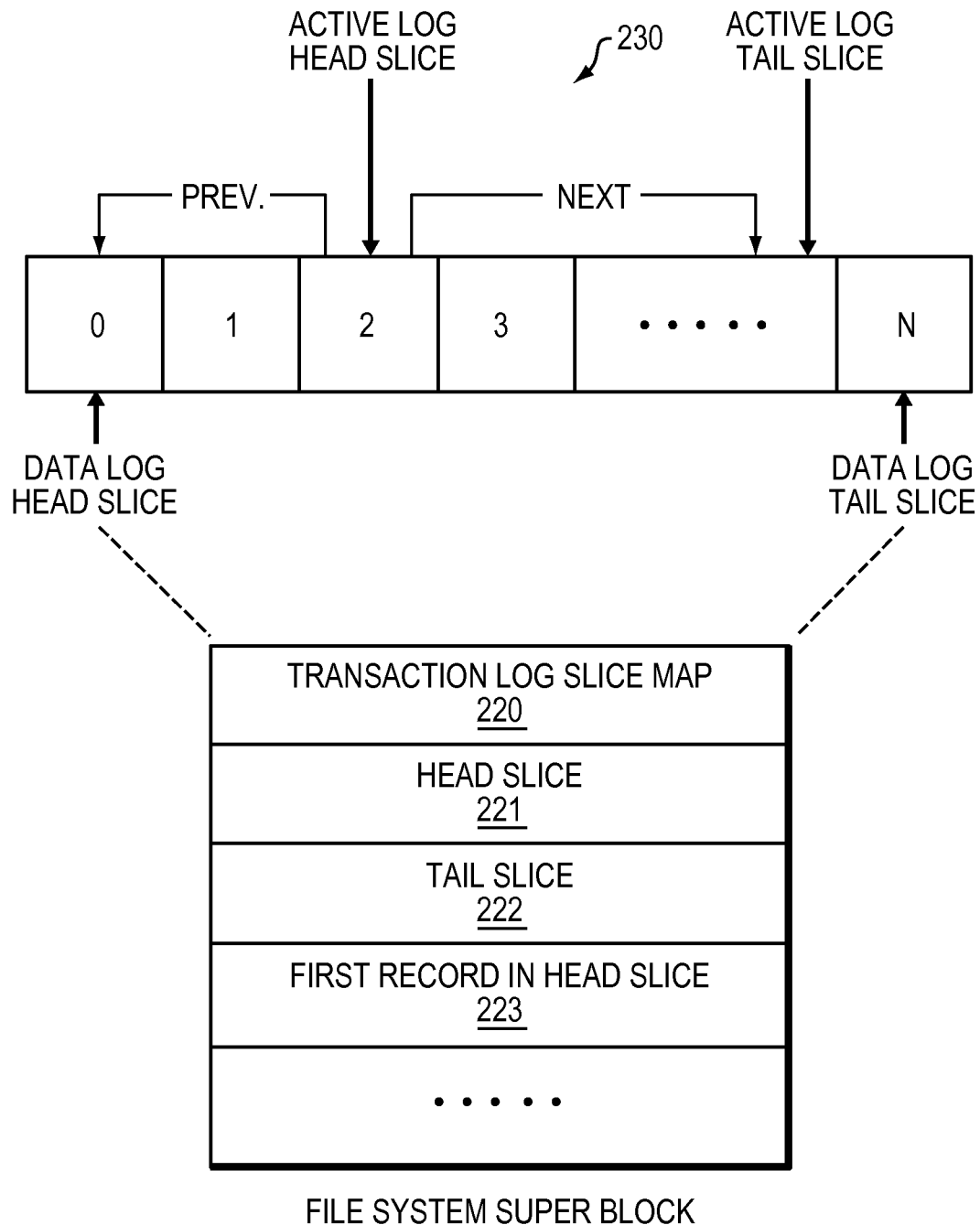

Referring to FIG. 8, shown is a detailed representation of components that may be included in an embodiment using the techniques described herein. With reference also to FIGS. 1-7, in at least one embodiment of the current technique, metadata of a file system such as a file system super block 72 includes information regarding a transaction log associated with the file system. The information in the file system super block 72 of a file system includes transaction log slice map 220 indicating information regarding slices provisioned for a transaction log associated with the file system, head slice 221 indicating the first slice in a list of transaction log slices allocated to the transaction log, tail slice 222 indicating the last slice in a list of transaction log slices provisioned for the transaction log, and first record in the head slice 223. In at least one embodiment of the current technique, slices used by a transaction log for a file system may be organized in a doubly linked list referred to as an active slice list such that the doubly-linked list includes back pointers in each entry, starting from the tail entry and proceeding to the head entry, with each back pointer pointing at the previous entry. The head pointer of the doubly linked list is referred to as an active log head slice and the tail pointer of the double linked list is referred to as an active log tail slice. Further, slices that are provisioned for a transaction log of a file system but not in use by the transaction log are organized as a linked list of free slices such that a free slice head points to the first slice in the linked list of free slices. A slice released by the transaction log as a free slice is added to the front of the linked list and a slice at the front of the linked list is allocated to the transaction log when requested by the transaction log. Slices that are not provisioned for a transaction log are organized as a linked list referred to as an un-provisioned slice list such that a head pointer points to the first slice in the un-provisioned slice list. When a slice is provisioned for a file system, the slice is removed from the un-provisioned slice list and added to the linked list of free slices. The active slice list, free slice list and un-provisioned slice list are stored in a data storage system as part of metadata and thus persist across reboots of the data storage system. A file system manages two bitmaps such that each bitmap represents the free and un-provisioned slice lists respectively. The active slice list is stored on a storage device in a tabular format such that each entry of the table includes an active slice identifier based on an order in which slices are organized in the active slice list. Further, a file system super block 72 includes information regarding location of the first chunk header of a transaction log.

When a transaction log is flushed to a storage device, each section of the transaction log is processed. In order to determine the next section after reading the first chunk header from file system super block 72, if the next chunk resides in the same slice as the current chunk that is being processed, the next chunk may be determined based on the size of the current chunk. However, if the next chunk resides in the next transaction log slice, the next chunk may be located at the end of the chunk header in the next transaction log slice. The next transaction log slice may be determined from the active slice list.

Further, in at least one embodiment of the current technique, a transaction log stores changes to data of a file of a file system in a data transaction log associated with the file system upon receiving a write I/O request. Similarly, changes to metadata of a file of a file system may be stored in a file system transaction log associated with the file system. However, it should be noted that a single transaction log may store changes to data and metadata of a file of a file system in a transaction log associated with the file system upon receiving a write I/O request. Further, a data log transaction is represented by a data log descriptor. A data log descriptor may include a set of data log records as a write I/O operation may include multiple changes to the file such that each change in data is represented by a data log record. Thus, a data log transaction tracks modifications to a set of data blocks that are associated with a write I/O request. A log hold (also referred to herein as "reference") is taken on each data block entry of a data transaction which is also referred to as a dirty data block. When a dirty data block is flushed to a storage device, the log hold is released for the dirty data block and a reference count of a data log descriptor associated with the dirty data block is decremented. Further, each data log descriptor includes a reference to a slice in the active slice list. When dirty data blocks for a data log transaction are flushed to a disk, a data log descriptor associated with the data log transaction is released which in turn releases the reference the data log slice that stores the data log descriptor. When each references to an active data log slice is released, the active data log slice is added to the free slice list and becomes available as a free slice that may be allocated by the data transaction log.

Further, each data log record associated with a data log transaction must reside in the same section of a data transaction log. Thus, a data storage system performs a check for determining availability of storage space for storing a data log transaction prior to writing a data log record in the data transaction log. If a current section does not have sufficient space available to store each data log record associated with a data log transaction, the data log records are stored in the next available section that has sufficient space available for storing the data log records.

A data log transaction is written at the logical end of a data transaction log indicated by an active log tail offset of an active log tail slice which is stored in an in-memory file system object. The active log tail offset is updated each time a data log transaction stored at the position indicated by the active log tail offset has been flushed to a disk. The active log tail offset includes information such as a tail slice identifier number, a tail chunk identifier number and a tail chunk offset. When the active log tail slice of a data transaction log is completely written to, a new slice is allocated from the free slice list such that the new slice becomes the new active log tail slice of the data transaction log. If the free slice list is empty, a new slice is removed from the un-provisioned slice list and added to the free slice list. In case, the un-provisioned slice list is empty, the next data log transaction is written to a data log head slice if the data log head slice includes storage space for writing a data log header associated with the next data log transaction. Thus, a data transaction log is organized as a circular log that wraps around when the data transaction log is unable to expand by requesting additional data log slices. Thus, in at least one embodiment of the current technique, if a pointer pointing to the next slice to which a data log descriptor associated with an incoming write I/O request may be written to is same as the head slice, the data transaction log requests a new slice.

Figure 9:
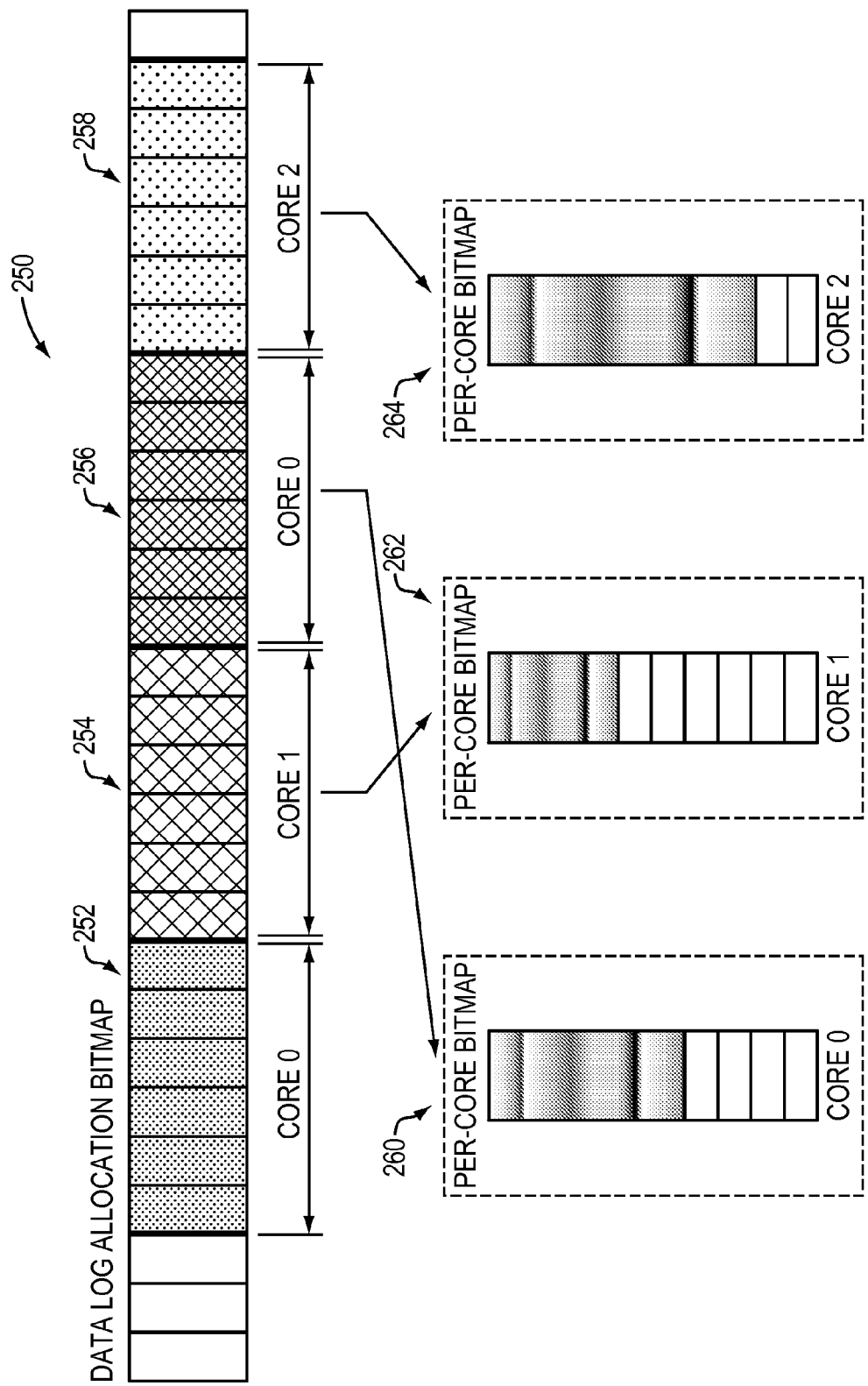

Referring to FIG. 9, shown is a detailed representation of components that may be included in an embodiment using the techniques described herein. With reference also to FIGS. 1-8, in at least one embodiment of the current technique, global data log allocation bitmap 250 is allocated for a file system for tracking allocation of transaction log space from data transaction log 130 associated with the file system. Further, a set of per-core bitmaps 260, 262, 264 are created for each core of a multi-core processor such that a per-core bitmap associated with a core of the multi-core processor tracks allocation of sections of transaction log space from the data transaction log 130.

In at least one embodiment of the current technique, when a core of a multi-core processor of a storage system receives a first write I/O request, a section of transaction log space is pre-allocated for that core by evaluating availability of transaction log space from data log allocation bitmap 250 such that a separate per-core bitmap is created for that core to track the section of transaction log space pre-allocated for the core. For example, transaction log space may be allocated to a per-core bitmap of a core in chunks of size one megabyte (1M) which may include 128 bits corresponding to the chunk of pre-allocated transaction log space. Thus, as shown in FIG. 9, for example, a section of transaction log space 252 is allocated for core-0 which is managed by per-core bitmap 260, a section of transaction log space 254 is allocated for core-1 which is managed by per-core bitmap 262, and a section of transaction log space 258 is allocated for core-2 which is managed by per-core bitmap 264. Thus, in at least one embodiment of the current technique, bits in a per-core bitmap may only be set for a section of transaction log space pre-allocated for that core during an initial write I/O request. Further, a per-core bitmap for a file system may include information regarding the location at which a section of transaction log space pre-allocated for the per-core bitmap resides within data log allocation bitmap 250 associated with the file system. In at least one embodiment, for example, the record ID of the starting position of a section of pre-allocated transaction log space may be included in a per-core bitmap.

In at least one embodiment of the current technique, subsequent write I/O requests processed by a core of a multi-core processor may use a per-core bitmap associated with that core for allocating a transaction log entry from a section of transaction log space that has been pre-allocated during an initial write I/O request to that core. Thus, for example, in FIG. 9, write I/O requests processed by core-0 of data storage system 10 uses per-core bitmap 260 for allocating transaction log entries for the write I/O requests processed by core-0. In such a case, if a write I/O request processed by a core is able to allocate a transaction log entry using a per-core bitmap for that core, data log allocation bitmap 250 is not evaluated by the system 10 thereby eliminating or reducing a lock contention scenario that may occur when different cores access the data log allocation bitmap 250 for a file system. However, if a write I/O request processed by a core is not able to allocate a transaction log entry using a per-core bitmap for that core, data log allocation bitmap 250 is evaluated to allocate an additional section of transaction log space by reserving a chunk of transaction log space for the core. Thus, for example, in FIG. 9, when transaction log space from the section 252 of data log allocation bitmap 250 is first pre-allocated by core-0 and is consumed entirely, another chunk 256 (also referred to herein as "portion") of transaction log space from data log allocation bitmap 250 is pre-allocated and associated with per-core bitmap 260 of core-0. However, in such a case, an additional section of transaction log space pre-allocated to a per-core bitmap may not be adjacent or contiguous to the previously allocated section of transaction log space from data log bitmap 250. Thus, a write I/O request processed by such a core may need to be apportioned into two or more requests for allocating transaction log entries where the first request allocates a transaction log entry from the previously allocated section of transaction log space and the second request allocates a transaction log entry from the additional section of transaction log space pre-allocated for the core.

In at least one embodiment of the current technique, when each bit of a per-core bitmap associated with a core of a multi-core processor of a storage system is set indicating that each transaction log entry represented by the bits of the per-core bitmap has been allocated, the per-core bitmap is reset with an additional section of transaction log space pre-allocated for the core such that the additional section of transaction log space is now managed by bits of the per-core bitmap.

Further, a transaction log descriptor (e.g., a data log descriptor) is created and associated with data written to the data transaction log 182. Thus, a data log descriptors list is created for each core of a multi-core processor of data storage system 12. A transaction log descriptor is added to an in-memory transaction log descriptors lists associated with a core of a multi-core processor of a storage system where this transaction log descriptor is created. Thus, on-disk contents of the file may be updated at a later time by a flush process that may execute in background asynchronous with a write I/O operation.

Further, flushing of data indicated by in-memory transaction log descriptors to on-disk contents of a file system stored on a persistent storage is delayed until a specific criteria (e.g., threshold, high water mark) is met. When transaction log entries from data transaction log 130 are flushed, transaction log space corresponding to the transaction log entries is freed. Further, each in-memory transaction log descriptors list associated with cores of a multi-core processor is evaluated for flushing data to a storage device. When processing in-memory transaction log descriptors list associated with a core of a multi-core processor for flushing, a portion of transaction log space that has been pre-allocated to that core is freed irrespective of whether the portion includes any unused transaction log space. In at least on embodiment of the current technique, a portion of transaction log space pre-allocated by a core of a multi-core processor may be freed by resetting bits of a portion of data log allocation bitmap 250 that is managed by bits in a per-core bitmap associated with the core thereby freeing the portion of transaction log space which can then be reused by other write requests and cores of the multi-core processor.

Conventionally, multiple transaction log headers are written to data transaction log 130 in a random order by different threads processing write requests in different cores of a multi-core processor. Thus, in such a conventional system, a section of transaction log space (e.g. 64 Kilobyte (KB) range may include transaction log entries from different cores thereby generating a lock contention when accessing a 64 k logical page in other layer (e.g. MCC) of a storage system by such different threads. Thus, in such a conventional system, multiple threads executing on different cores of a multi-core processor attempts to access a logical page (64 Kilobyte portion of a logical page) in MCC layer thereby preventing other threads in a system from acquiring storage resources, reducing overall I/O throughput and lock contention.

By contrast, in at least one embodiment of the current technique, a section of transaction log space (e.g., 1 Megabyte (1 M)) managed by a per-core bitmap of a core of a multi-core processor may include a certain number (e.g., 64K) of metadata (such as transaction log headers) which may all be used by the same core. Thus, when a write request is committed, transaction log headers associated with the write request are written to a contiguous portion of memory which has been pre-allocated for a core of a multi-core processor. Thus, by pre-allocating a contiguous portion of memory and a per-core bitmap for each core of a multi-core processor, transaction log headers are written to the same range of contiguous section of transaction log space by a single core thereby eliminating or reducing lock contention when different cores access a logical page resulting into increase in overall I/O throughput.

Further, in at least one embodiment of the current technique, small write I/O requests (e.g., writes to a sector) may be aggregated into one single large write request in order to further reduce the lock contention when writing transaction log headers by multiple cores to a logical page. Further, such transaction log header write requests may be aggregated together to reduce the amount of overhead involved because such write requests are associated with the same core of a multi-core processor and directed to a single contiguous portion of pre-allocated transaction log space.

As described above herein, a data log descriptor may include a set of data log records as a write I/O operation may include multiple changes to the file such that each change in data is represented by a data log record. Thus, a data log transaction tracks modifications to a set of data blocks that are associated with a write I/O request. Thus, time information such as a time stamp is included in each data log record of a transaction log descriptor because each data log record is associated with a different dirty data block (GDBC entry) and thus may have different time stamp.

Further, transaction log descriptors stored in in-memory lists indicate changes to data and/or metadata that are required to be written to the transaction log 182. Further, the order in which the transaction log descriptors are flushed to the transaction log 182 or replayed from the transaction log 182 is managed by timestamp information maintained in each transaction log descriptor. Thus, a transaction log queues data associated with write I/O requests in the same order in which the write I/O requests have been issued to a data storage system such that data associated with the write I/O requests can be flushed to a storage device or replayed in the same order in which the write I/O requests have been issued.

In at least one embodiment of the current technique, each transaction log entry allocated using a per-core bitmap associated with a core of a multi-core processor and on a transaction log organized on a persistent storage includes time information such as a timestamp which stores the time at which the transaction log entry has been created. The timestamp information is used to arrange transaction log descriptors in an ordered arrangement across multiple bitmaps associated with a set of cores of a multi-core processor such that transaction log entries managed by the multiple bitmaps associated with the set of cores can be flushed to a persistent storage and/or replayed from a transaction log in the same order in which the transaction log entries have been created based on incoming I/O requests. Further, it may be possible that time stamp information included in a transaction log entry of a per-core bitmap associated with a first core of a multi-core processor may skew from time stamp information included in a transaction log entry of a per-core bitmap associated with a second core of the multi-core processor because the first and second cores may drift apart due to a difference in time information maintained using ticks of each CPU being different from each other. Thus, in order to maintain a global ordering of transaction log entries across different per-core bitmaps associated with a set of cores of a multi-core processor, timestamp information included in each transaction log entry is used to maintain an order such that updates to a buffer cache block may be synchronized in the same order in which write requests have been directed to the buffer cache block.

Figure 10:
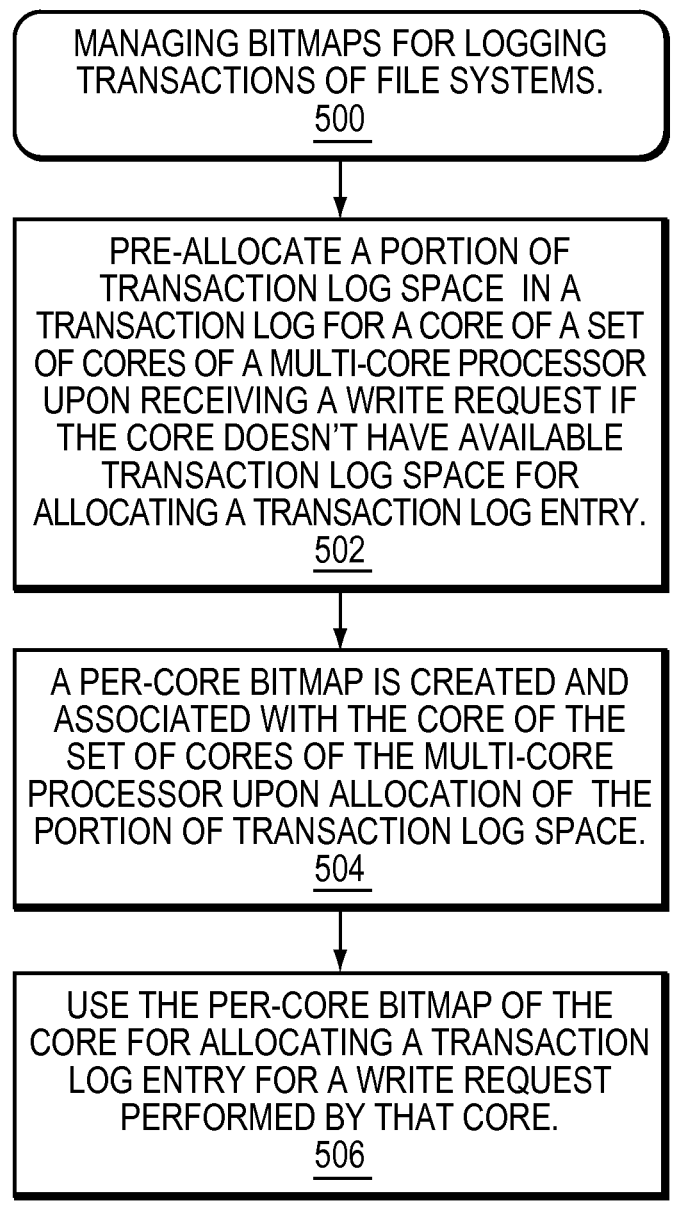
FIG. 10 is a flow diagram illustrating processes that may be used in connection with techniques herein.

Referring to FIG. 10, shown is a flow diagram illustrating the method of managing log transactions in storage systems. With reference also to FIGS. 1-9, in at least one embodiment current technique, a section of transaction log space of data transaction log is pre-allocated for a core of a set of cores of a multi-core storage processor of a storage system upon receiving a write request on that core after determining that the core does not have available transaction log entries for allocation (step 502). A per-core bitmap is created for the core and associated with the core of the multi-core storage processor such that each bit in the per-core bitmap manages the section of transaction log space that has been pre-allocated for that core (step 504). The per-core bitmap is used for allocating a data transaction log entry from the pre-allocated section of transaction log space for the write request performed by that core (step 506).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing log transactions in storage systems, the method comprising:
   allocating a first portion of a transaction log space from a persistent journal associated with a file system to a first core of a multi-core storage processor and a second portion of the transaction log space from the persistent journal to a second core of the multi-core storage processor; and
   using a set of per-core bitmaps for allocating a set of transaction log entries from the persistent journal, wherein each per-core bitmap is associated with a respective core of the multi-core storage processor, wherein a per-core bitmap of the set of per-core bitmaps associated with a core of the multi-core storage processor is used for allocating a transaction log entry for a write request performed by the core.

2. The method of claim 1, wherein a first per-core bitmap of the set of per-core bitmaps is used for allocating a transaction log entry from the first portion of the transaction log space for a write request performed by the first core, wherein a second per-core bitmap of the set of per-core bitmaps is used for allocating a transaction log entry from the second portion of the transaction log space for a write request performed by the second core.

3. The method of claim 1, further comprising:
   using a global data log bitmap associated with the file system for tracking portions of transaction log space of the persistent journal allocated to the set of per-core bitmaps.

4. The method of claim 1, wherein the multi-core storage processor resides in a storage system and includes a set of cores.

5. The method of claim 1, wherein a global data cache includes a set of global data block cache descriptors for storing information for a set of buffer cache objects stored in the volatile memory of the data storage system, wherein a global data block cache descriptor of the set of global data block cache descriptors is associated with a buffer cache object of the set of buffer cache objects, wherein a buffer cache object stores a data block of the file of the file system.

6. The method of claim 1, wherein the persistent journal is a data transaction log, wherein the data transaction log is apportioned into a set of sections, wherein a section of the set of sections include a header area and a record area, wherein the header area includes a chunk header and a set of data log headers, wherein the record area includes a set of data log records, wherein a data log record of the set of data log records includes data and a data log header associated with the data.

7. The method of claim 1, wherein the persistent journal is a file system transaction log for a file system, wherein the file system transaction log stores metadata transactions for the file system.

8. The method of claim 1, wherein the set of per-core bitmaps are processed concurrently for performing a set of write I/Os directed to the multi-core storage processor.

9. The method of claim 1, further comprising:
   determining whether each entry of a portion of the transaction log space allocated to a per-core bitmap of the set of per-core bitmaps has been consumed;
   based on the determination, determining whether to clear bits of the per-core bitmap; and
   based on the determination, allocating another portion of the transaction log space to the per-core bitmap and associating the bits to the other portion of the transaction log space.

10. The method for claim 1, further comprising:
    receiving a request to replay log transactions of the persistent journal; and
    creating a set of log transaction entries in a volatile memory of a storage system in an ordered arrangement, wherein the set of log transaction entries are created from log transaction entries allocated using each per-core bitmap of the set of per-core bitmaps, wherein a timestamp information stored in each log transaction entry is used to arrange the set of log transaction entry in the ordered arrangement.

11. A system for use in managing log transactions in storage systems, the system comprising:
    first logic allocating a first portion of a transaction log space from a persistent journal associated with a file system to a first core of a multi-core storage processor and a second portion of the transaction log space from the persistent journal to a second core of the multi-core storage processor; and
    second logic using a set of per-core bitmaps for allocating a set of transaction log entries from the persistent journal, wherein each per-core bitmap is associated with a respective core of the multi-core storage processor, wherein a per-core bitmap of the set of per-core bitmaps associated with a core of the multi-core storage processor is used for allocating a transaction log entry for a write request performed by the core.

12. The system of claim 11, wherein a first per-core bitmap of the set of per-core bitmaps is used for allocating a transaction log entry from the first portion of the transaction log space for a write request performed by the first core, wherein a second per-core bitmap of the set of per-core bitmaps is used for allocating a transaction log entry from the second portion of the transaction log space for a write request performed by the second core.

13. The system of claim 11, further comprising:
third logic using a global data log bitmap associated with the file system for tracking portions of transaction log space of the persistent journal allocated to the set of per-core bitmaps.

14. The system of claim 11, wherein the multi-core storage processor resides in a storage system and includes a set of cores.

15. The system of claim 11, wherein a global data cache includes a set of global data block cache descriptors for storing information for a set of buffer cache objects stored in the volatile memory of the data storage system, wherein a global data block cache descriptor of the set of global data block cache descriptors is associated with a buffer cache object of the set of buffer cache objects, wherein a buffer cache object stores a data block of the file of the file system.

16. The system of claim 11, wherein the persistent journal is a data transaction log, wherein the data transaction log is apportioned into a set of sections, wherein a section of the set of sections include a header area and a record area, wherein the header area includes a chunk header and a set of data log headers, wherein the record area includes a set of data log records, wherein a data log record of the set of data log records includes data and a data log header associated with the data.

17. The system of claim 11, wherein the persistent journal is a file system transaction log for a file system, wherein the file system transaction log stores metadata transactions for the file system.

18. The system of claim 11, wherein the set of per-core bitmaps are processed concurrently for performing a set of write I/Os directed to the multi-core storage processor.

19. The system of claim 11, further comprising:
third logic determining whether each entry of a portion of the transaction log space allocated to a per-core bitmap of the set of per-core bitmaps has been consumed;
fourth logic determining, based on the determination, whether to clear bits of the per-core bitmap; and
fifth logic allocating, based on the determination, another portion of the transaction log space to the per-core bitmap and associating the bits to the other portion of the transaction log space.

20. The system for claim 11, further comprising:
third logic receiving a request to replay log transactions of the persistent journal; and
fourth logic creating a set of log transaction entries in a volatile memory of a storage system in an ordered arrangement, wherein the set of log transaction entries are created from log transaction entries allocated using each per-core bitmap of the set of per-core bitmaps, wherein a timestamp information stored in each log transaction entry is used to arrange the set of log transaction entry in the ordered arrangement.

* * * * *